(12) United States Patent
Krishnan et al.

(10) Patent No.: US 11,102,318 B1
(45) Date of Patent: *Aug. 24, 2021

(54) METHOD AND SYSTEM APPLICATIONS FOR PUSH NOTIFICATION

(71) Applicant: VARIAN MEDICAL SYSTEMS, INC., Cham (CH)

(72) Inventors: Kalyanaraman Balasubramaniam Krishnan, Sunnyvale, CA (US); Nambi Narasimhan, Fremont, CA (US)

(73) Assignee: VARIAN MEDICAL SYSTEMS, INC., Palo Alto, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/424,392

(22) Filed: May 28, 2019

Related U.S. Application Data

(63) Continuation of application No. 14/339,219, filed on Jul. 23, 2014, now Pat. No. 10,334,066.

(51) Int. Cl.
*H04L 29/08* (2006.01)
*H04W 4/00* (2018.01)

(52) U.S. Cl.
CPC .............. *H04L 67/26* (2013.01); *H04L 67/02* (2013.01); *H04W 4/00* (2013.01)

(58) Field of Classification Search
CPC ........... H04L 67/02; H04L 67/26; H04W 4/00
USPC ........................................................ 709/204
See application file for complete search history.

(56) References Cited

U.S. PATENT DOCUMENTS

| | | | |
|---|---|---|---|
| 8,739,249 B1 | 5/2014 | Kay et al. | |
| 9,699,625 B2* | 7/2017 | Kaplinger | ............... H04L 69/08 |
| 2005/0258938 A1* | 11/2005 | Moulson | ................. H04M 3/02 |
| | | | 340/7.58 |
| 2012/0311046 A1* | 12/2012 | Grigoriev | ............. H04L 45/308 |
| | | | 709/206 |
| 2013/0144974 A1* | 6/2013 | Haakenson | ............. H04L 67/26 |
| | | | 709/217 |
| 2013/0246504 A1 | 9/2013 | Hu et al. | |
| 2014/0337424 A1* | 11/2014 | Lee | ..................... H04L 63/0823 |
| | | | 709/204 |
| 2015/0189620 A1 | 7/2015 | Metral | |
| 2015/0237151 A1 | 8/2015 | Lau et al. | |

* cited by examiner

*Primary Examiner* — Zi Ye
(74) *Attorney, Agent, or Firm* — Foley & Lardner LLP (57) ABSTRACT

Embodiments of the present invention are directed to a method, system, and article of manufacture of a native notification center app that receive all types of push notifications. The push notification payload contains the URL to be launched when touched on the display of a mobile device and the custom data to be passed to the web application on launch. The push message sent to the notification center app and when the app is opened, which lists all the push notifications. When the user touches a notification, the URL in that notification can be launched in the browser and the custom data can be made available to the web application as parameters.

20 Claims, 7 Drawing Sheets

METHOD AND SYSTEM APPLICATIONS FOR PUSH NOTIFICATION

CROSS REFERENCE TO RELATED APPLICATIONS

This application is a continuation application of U.S. patent application Ser. No. 14/339,219, filed Jul. 23, 2014, which is incorporated herein by reference in its entirety.

TECHNICAL FIELD

The present invention relates generally to software and mobile applications, and more particularly to push notifications between a web application server, a notification service, and a platform push provider.

BACKGROUND ART

Widely adoption of mobile devices by consumers and a vast array of information on the Internet pose interesting scenarios on how vendors can more effectively deliver electronic content to consumers as well consumers' preferences in receiving relevant and updated information. Push notification is a feature in mobile platforms where a server sends a message to a particular native app on one or more particular devices. A mobile platform is able to receive the push notification even if the application is not running Typically, an alert can be displayed, a sound can be played, and/or a number can be displayed on an app icon and the push message can carry a custom data payload.

Some conventional solutions of push notifications include APNS Push Notification for iOS devices, GCM Push Notification for Android Devices, Websockets for full duplex communication over TCP for web applications, CometD for Ajax based Push technology, and notification center for place where notifications that have been received are displayed.

However, push notification is currently inoperable work with HTML5 mobile web apps. For example, if a CNN (The Cable News Network) news app is installed on a mobile device, the user can get push notifications of breaking news sourced from CNN. If the user does not have a native app, but goes to the website, there is no way for the site to send another party a push notification to the user's mobile device when the user is not accessing the site (Push notifications are different from email and texts).

In a business environment with HTML5 apps, such as time approval, there is a challenge where the manager needs to be notified when someone submits a leave request. Accordingly, it is desirable to have a system and method for businesses that use a HTML5 strategy for mobile apps to leverage push notifications.

SUMMARY

Embodiments of the present invention are directed to a method, system, and article of manufacture of a native notification center app that receive all types of push notifications. The push notification payload contains the URL to be launched when touched on the display of a mobile device and the custom data to be passed to the web application on launch.

The push message is sent to the notification center app and when the app is opened. The push message lists all the push notifications. When the user touches a notification, the URL in that notification's payload can be launched in the browser and the custom data can be made available to the web application as parameters.

Embodiments of the present invention are directed to a method, system and article of manufacture enabling a system that hosts a mobile web application to send a push notification to a user's mobile device whereby the target of the push message is either a notification center app or a browser app on the device.

Broadly stated, a method for sending notification to user, comprising registering a website with a platform independent notification service; accessing the website on a mobile browser and allowing the website permission to send push notifications; and sending the push notifications from the website to the mobile device that trusts the website through a notification service.

The structures and methods of the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

BRIEF DESCRIPTION OF THE DRAWINGS

The invention will be described with respect to specific embodiments thereof, and reference will be made to the drawings, in which.

DETAILED DESCRIPTION

A description of structural embodiments and methods of the present invention is provided with reference to FIGS. 1-7. It is to be understood that there is no intention to limit the invention to the specifically disclosed embodiments but that the invention may be practiced using other features, elements, methods and embodiments. Like elements in various embodiments are commonly referred to with corresponding reference numerals.

Figure 1:
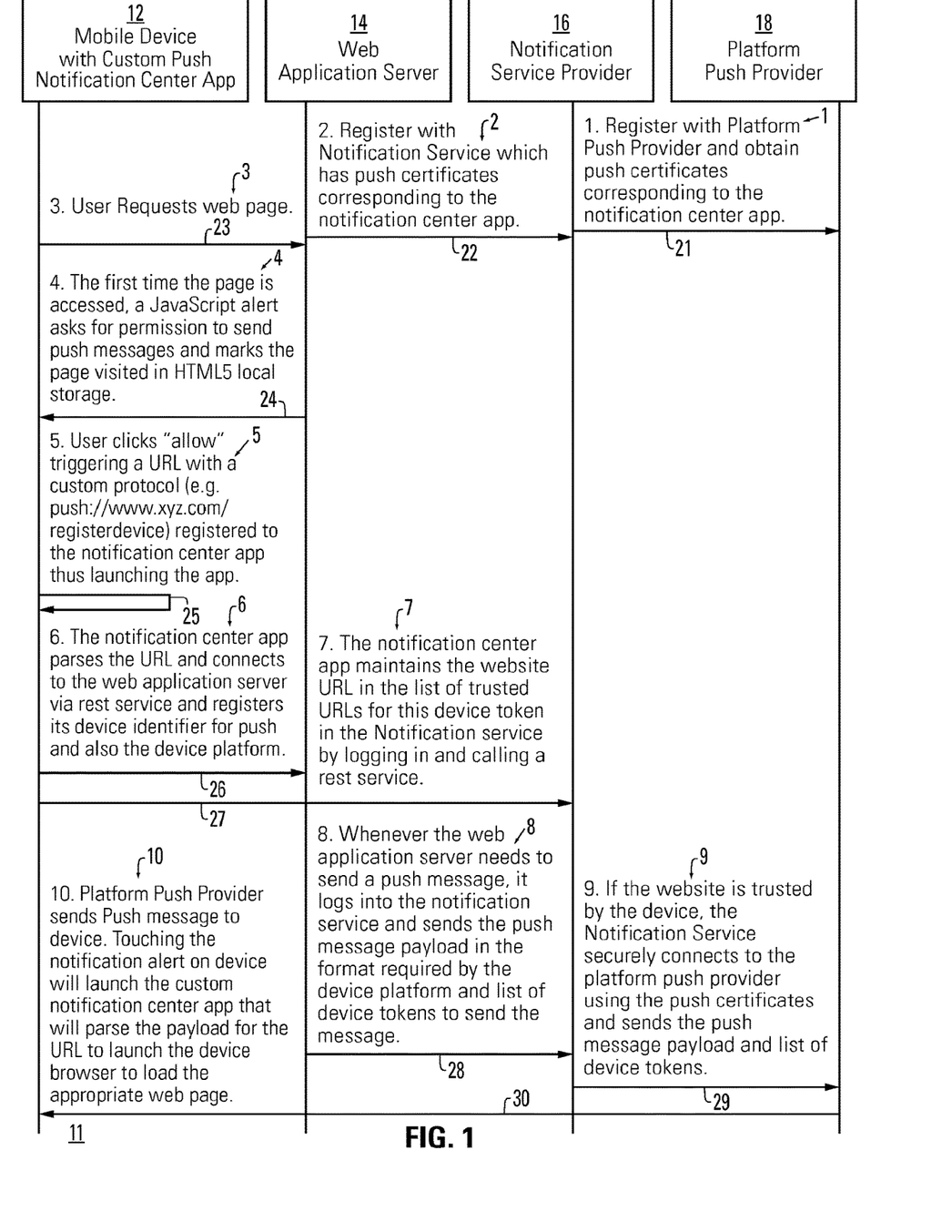
FIG. 1 is a sequence diagram illustrating a first embodiment of a notification center app to enable push notifications for mobile web in accordance with various embodiments of the present invention.

FIG. 1 is a sequence diagram illustrating a first methodology embodiment 10 of a notification center app to enable push notifications for mobile web operating in a computing environment with a mobile device 12 with custom notification center app, a web application server 14, a notification service (also referred to "notification service provider") 16, and a platform push provider 18. The activity and flow diagram in FIG. 1 shows how website push notifications can be enabled using a custom notification center app installed on the mobile device 12. The first seven steps (1-7), referenced as reference numbers 21-27, are setup activities, while the subsequent three steps (8-10), referenced as reference numbers 28-30, are followed whenever the website needs to send push message subsequently.

At step 1, a notification center app native to each type of device operating system is built. To accomplish this task, the notification service provider (or notification service) 16 registers with the platform push provider 18, as shown by an arrow 21 and obtains development and push certificates. The notification service provider 16 develops the app and makes the app available for download on an enterprise app store or public app store. The user downloads the notification center app and registers with the notification service provider 16 through the downloaded app. The application connects to a secure rest service on the notification service 16 and sends the below JSON Message.

{
deviceToken: <the unique device token corresponding to the application on a particular device>,
deviceOS: <the device operating system>, deviceOSVersion: <the version of the device operating system>userID: <optional and can be used when a user account is needed for business logic>}

This data is saved by the notification service into a database. This will be used by the notification service to choose the correct Platform Push Provider for sending a push message.

At step 2, websites from the web application server 14 can register with the notification service provider 16 to send push messages to the notification center app, as shown by an arrow 22. Only the notification service 16 has the push certificates to send the notifications. This ensures against unwanted spamming of end users by websites. Website administrators create an account with the notification service using a registration page including the following details: (a) website host (that sends the push message); (b) business tax registration number (such as a DUNS number); (c) IP Address range used by the push sender; (d) Login username and password; (e) business address, and (f) Business contact information.

At step 3, as illustrated by an arrow 23, the user's mobile device 12 with custom push notification center app requests a web page or accesses the website using any browser on the mobile device 12.

At step 4, when a user tries to access a website (that is registered with the notification service) for the first time as depicted by an arrow 24, the web page launches a JavaScript alert and asks permission to send push notifications. The page then marks that the user has been queried for permission for push notifications in HTML5 local storage to prevent querying the user through the mobile device 12 again. If the user's mobile device 12 (or the user) desires to be prompted again, the user through the mobile device 12 can clear the local cache on the mobile device 12 and/or use their account profile in the website (if applicable) to manage notification settings. In one embodiment, a web service at each website that would like to send push messages without the necessity of an app performs a one-time registration with the notification service. This in part minimizes or prevents spammers. When a web service at the website needs to send push notifications to end user devices, an end user through an end user device registers with business DUNS number so that the website service knows the sender's business details and to choose a method by which the website service is authenticated when sending the push message.

Optionally, the notification service may also choose to charge a nominal fee for the push services at the time of registration (in non-enterprise commercial embodiments).

At step 5, as shown by an arrow 25, if the user's mobile device 12 chooses to "allow" the website to send push messages, the page uses javascript to launch a URL with a custom protocol (e.g., push://www.xyz.com/registerdevice) where push:// is the custom protocol registered with the notification center app. The custom protocol pushs:// can be used instead of push:// to substitute for SSL based secure connections.

At step 6, as shown by an arrow 26, launching the URL with a custom protocol on the mobile device 12 launches the notification center app that adds the website URL to its list of trusted URLS (e.g., if the URL is push://www.xyz.com, the app stores http://www.xyz.com and if the URL is pushs://www.xyz.com, the app stores https://www.xyz.com) and connect to a rest service on the webserver as specified in the URL and post its unique push device token received from the platform push provider (such as Apple Push Notification Service APNS or Google Cloud Messaging GCM) and its device details (such as Operating system and Version). The web application server 14 can then store these details in a database for sending subsequent push messages. The following JSON message is sent from the device to the website's push registration rest service.

{
deviceToken: <the unique device token corresponding to the application on a particular device>,
deviceOS: <the device operating system>, deviceOSVersion: <the version of the device operating system>userID: <optional and can be used when a user account is needed for business logic>}

At step 7, the notification center app on the mobile device 12 maintains settings where the user can manage the list of trusted websites. If a trusted website is added or deleted by the user's mobile device 12, the changes are updated in the notification service provider 16 by calling a rest service, as illustrated by an arrow 2. The following JSON message can be sent:

{
deviceToken: <the unique device token corresponding to the application on a particular device>,
trustedURL: <the URL of the website that wishes to send push messages>, action: <Add or Delete>}

As shown by an arrow 28, at step 8, whenever the web application server 14 needs to send a push message, the web application server 14 logs into the notification service provider 16 using the credentials obtained in step 2 and sends the push message payload in the format required by the device platform and list of device tokens to send the message. The following JSON message can be used.

{
deviceTokens: [<array of deviceTokens to whom the message is to be sent>], Payload: <String representation of the payload expected by the platform push provider>}

At step 9, the notification services provider 16 looks up its database for each device token to determine if that device trusts that website to send a push notification (for example, a mapping record in the database mapping the device token to the website based on step 7). If the website is trusted, the notification service provider 29 connects to the platform push provider 18 using the push certificates and sends the push payload, as shown by an arrow 29. If the website is not trusted, the notification service provider 16 can send a status message back using the following JSON format.

{
   deviceTokens: [<array of device Tokens for which a push message was requested>], pushStatus: [<array of success, error, warning, information>], pushMessage: [<array of message strings such as "Push not allowed by device"] }

At step 10, as shown by an arrow 30, the platform push provider 18, such as Apple Push Notification Service (APNS) or Google Cloud Messaging (GCM), then sends the push message to the mobile device 12 following their standard mechanisms.

Figure 2:
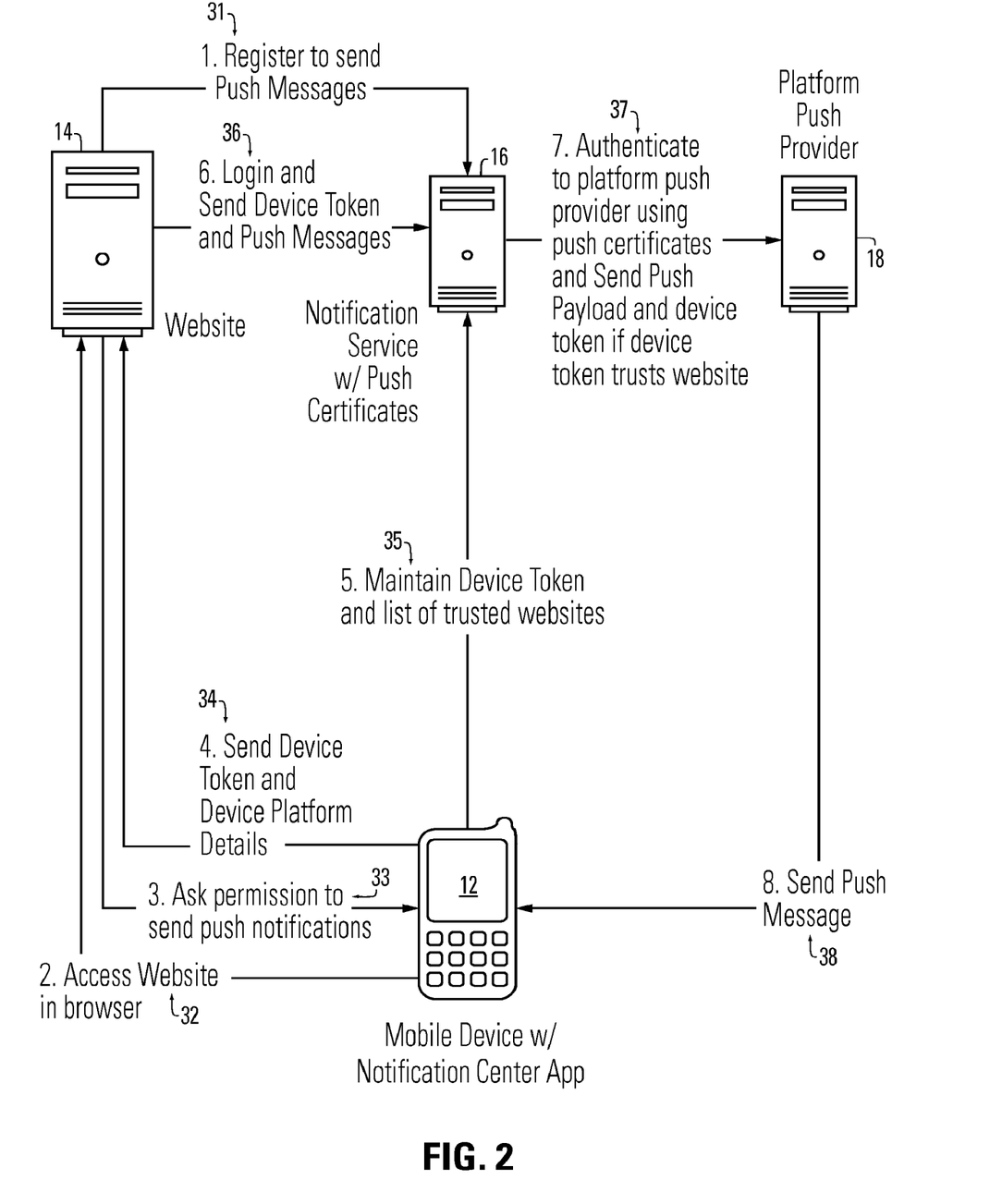
FIG. 2 is a block diagram illustrating the first embodiment of the push notification system in accordance with various embodiments of the present invention

FIG. 2 is a system diagram illustrating the first embodiment of the push notification system as described with respect to FIG. 1. The system diagram shows the mobile device 12, the web application server (or "website") 14, the notification servicer provider 18, and the platform push provider 18. The operational process of the system diagram in FIG. 2 is similar to the description provided in the sequence diagram of FIG. 1.

Figure 3:
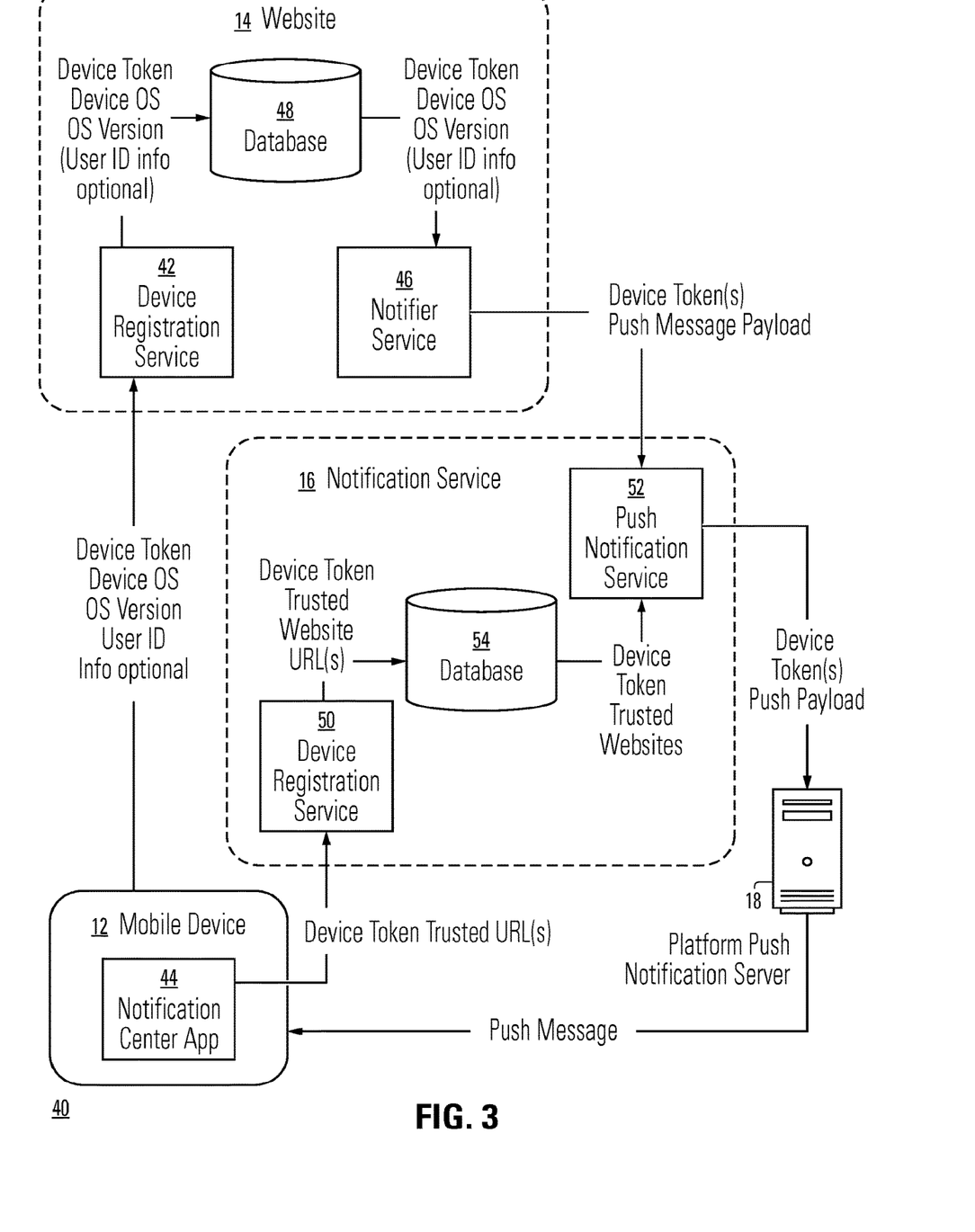
FIG. 3 is a block diagram elaborating elements of the push notification system in the first embodiment in accordance with various embodiments of the present invention.

FIG. 3 is a block diagram 40 elaborating elements of the push notification system in the first embodiment. A device registration service 42 a rest service that can receive a JSON based payload posted over http/http(s) and is used to store the device token, device operating system and device OS version sent by a notification center app 44 when the user chooses to allow notifications from the website. As an example, the JSON message can be in the following format:

{
   deviceToken: <the unique device token corresponding to the application on a particular device>,
   deviceOS: <the device operating system>,
   device0SVersion: <the version of the device operating system>userID: <optional and can be used when a user account is needed for business logic>}

When the website needs to send a push notification, a notifier service 46 reads the device token information from a database 48 and formats the push payload based on the device operating system requirements and logs onto the notification service 16 and sends the push payload and the device tokens to which the push message needs to be sent.

In the notification service 16, a device registration service 50 is a rest service that can receive a JSON based payload posted over http/http(s) and is used to store the device token and the trusted URL of a website sent by the notification center app when user chooses to allow notifications from the website. The JSON message can be in the following format {
   deviceToken: <the unique device token corresponding to the application on a particular device>,
   trustedHost: <the host URL of the website that is trusted by the device user>}

The rest service can offer create and delete actions whereby this mapping can be added or removed based on the user choice.

In the notification service 16, when the website sends a push notification to this rest service, a push notification service 52 reads the device token information from a database 54 and checks if a mapping exists between the device Token and the website host. If so, this service connects to the platform push provider (such as Apple's APNS or Google's GCM) and sends the push payload and the device tokens to which the push message needs to be sent.

In the mobile device 12, a notification center app 42 is a mobile application that is native to the mobile device's operating system and allows the user to register with the notification service 16 and also registers the custom push protocol so the notification center app 42 can be launched by the browser when the user chooses to allow push messages from a website. The notification center app 42 then calls the device registration service 52 to register its mobile device token mapped to the trusted website. The notification center app 42 also calls the device registration service of the website to register its device token, device operating system and device operating system version.

When the push message is received by the device and touched by a user, the notification center app 42 launches and reads the push message. It looks for a "URL" parameter and launches a web browser to take the user to the website.

The following is an example flow in an enterprise leave request embodiment. First, the user downloads the notification center app onto their corporate device from their enterprise app store. Second, the server having the leave request application is registered with the notification service using a service user. Third, a manager through a mobile device or a managing module on the mobile device to accesses to the leave request website to view and approve leave requests. Fourth, the website prompts for permission to send push notifications. The manager through the mobile device or the managing module chooses allow. Fifth, the browser launches pushs://www.xyz.com/registerdevice where the "push" custom protocol is registered to the notification center app. Sixth, the notification center app on device is launched and it registers the leave request website as a trusted website with the notification service. It also connects to the leave request website's device registration service (https://www.xyz.com/registerdevice) and posts its device token and device OS and version details. Seventh, an end user applies for leave. This causes the web application server's business logic to identify the end user's manager's user ID and their device token and send the device token and the push message containing the leave request information. Eighth, the notification service checks that the device token is mapped to the leave request website and if so, sends the push message to the platform push provider. Ninth, the push message reaches the device and the manager sees an alert message that "John Doe has applied for 2 days Paid Leave" and when the manager touches the notification, it launches the notification center app that reads the push message for the URL parameter which can look like the below example: https://xyz.com/leaverequest?id=6535653 where the id can be a leave request ID. Tenth, the notification center app launches a browser that goes to this URL and the leave request application understands that the user is trying to view a particular leave request and goes straight to that entry allowing the manager to approve quickly. For instance, a user can access a smartphone, such as iPhone, by going to the settings and the notification center, where each app's notification option can be customized. In a browser's settings like Safari, the end user sees a list of trusted URLs that the user can manage. The user can either choose to block a push notification from a particular website, delete the website from the list of trusted URLs, and/or change the type of notifications (e.g., banner, alerts) as available in the notification center. Blacklisting websites and blocking techniques may also be available.

The following is an example flow operating in a public, general, commercial, or global embodiment (a news website, e.g. CNN), which is not limited to an enterprise context. First, the user downloads the notification center app onto their device from the public app store. Second, the news website is registered with the notification service and receives login credentials. Third, a user goes to the new site. Fourth, the website prompts for permission to send push notifications. The user chooses allow. Fifth, the browser launches pushs://www.xyz.com/registerdevice where the "pushs" custom protocol is registered to the notification center app. Sixth, the notification center app on device is launched and it registers the news website as a trusted website with the notification service. It also connects to the news website's device registration service (https://www.xyz.com/registerdevice) and posts its device token and device OS and version details. Seventh, some breaking news happens. This causes the web application server's business logic to read the list of device tokens and send the device token and the push message containing the breaking news information to the notification service. Eighth, the notification service checks that the device token is mapped to the news website and if so, sends the push message to the platform push provider. Ninth, the push message reaches the device and the user sees an alert message that "Arctic freeze grounds planes" and when the user touches the notification, it launches the notification center app that reads the push message for the URL parameter which can look like the below example: https://xyz.com/newsarticles?id=6535653 where the id can be a new article ID. Tenth, the notification center app launches a browser that goes to this URL and the new website understands that the user is trying to view a particular story and goes straight to that page. (just to given an example, in iPhones, one can go to settings and then notification center, and each app's notification options can be customized. If one turns on safari's notification, what happens? Does the user's activities on safari, if the user opts to receive push notification on a website accessed by safari, will now receive push notification?)

Figure 4:
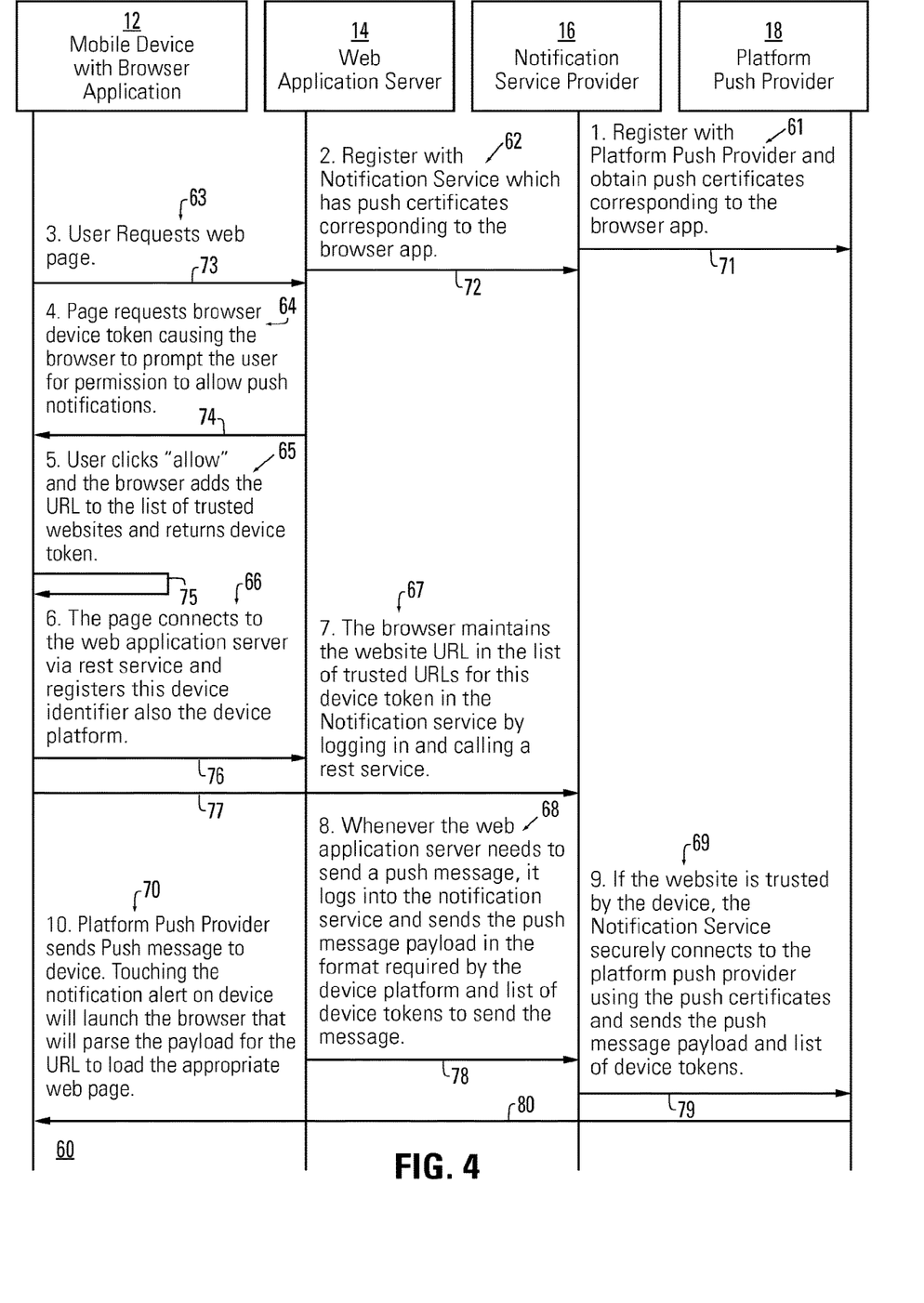
FIG. 4 is a sequence diagram illustrating a second embodiment of a notification center app to enable push notifications for mobile web in accordance with various embodiments of the present invention.

FIG. 4 is a sequence diagram illustrating a second methodology embodiment 60 of a notification center app to enable push notifications for mobile web. This embodiment uses a mobile browser to enable Push Notifications for mobile web. This figure shows how website push notifications can be enabled using a custom notification center app installed on the mobile device 12. Among the ten steps in this methodology, the first seven steps or operations (referenced as steps 61 through 67) are setup activities, while subsequent three steps (referenced as steps eight through ten) are followed whenever the website needs to send push message subsequently.

The first step in the second embodiment or at step 61 is to use a browser app native to each type of device platform that is intended to be supported as the target for push notifications. To do this, the notification service provider obtains push certificates from the browser vendor, as shown by an arrow 71. The browser when launched connects to a secure rest service on the Notification Service and sends the below JSON Message.

{
deviceToken: <the unique device token corresponding to the application on a particular device>,
deviceOS: <the device operating system>, deviceOSVersion: <the version of the device operating system>userID: <optional and can be used when a user account is needed for business logic>}

This data gets saved by the notification service into a database. This will be used by the notification service to choose the correct Platform Push Provider for sending a push message.

At the second step of the second embodiment or step 62, for the website that needs to send a push message, the notification service provider 16 is registered with the platform push provider and obtain credentials (a login and/or a client certificate), as shown by an arrow 772.

Only the notification service 16 has the push certificates to send the notifications. This ensures against unwanted spamming of end users by websites. Website administrators create an account with the notification service using a registration page including the following details: (a) website host (that sends the push message); (b) business Tax Registration Number (such as a DUNS number); (c) IP Address range used by the push sender; (d) Login username and password; (e) Business Address; and (f) Business contact information.

In the third step of the second embodiment or at step 63, as illustrated by an arrow 73, the user's mobile device 12 with custom push notification center app requests a web page or accesses the website using any browser on the mobile device 12.

In the fourth step of the second embodiment or at step 64, as shown by an arrow 74, when a user tries to access a website for the first time, it uses a java script API to check if the website is already trusted. The browser then looks into its list of trusted URLs and if the website is already trusted, a Boolean "true" is returned. If the website is not trusted, it receives a false and requests for the browser's device token. This prompts the browser to ask the user permission to allow push notifications from the website. The process is similar to how current browsers ask for location information.

In the fifth step of the second embodiment or at step 65, if the user chooses to "allow" the website to send push messages, the browser adds the website host to its list of trusted hosts, as shown by an arrow 75. If the user chooses not to allow, the website can be added to a disallowed list.

In the sixth step of the second embodiment or at step 66, as shown by an arrow 76, if the user clicks allow, the browser returns its device token to the page that can store that device token in its server database along with device operating system details for future usage. If the website was already blacklisted, a java script exception that the website is not trusted can be thrown.

In the seventh step of the second embodiment or at step 67, as illustrated by an arrow 77, once the page gets the device token, the page can call a rest service on its webserver to store the device token and device platform details for future use.

In the eighth step of the second embodiment or at step 68, as illustrated by an arrow 78, the browser then connects to a rest service on the notification service to maintain the trusted hosts list In the ninth step of the second embodiment or at step 69, as illustrated by an arrow 79, whenever the web application server 14 would like to send a push message, the web application server 14 logs into the notification service and sends the push message payload in the format required by the device platform and list of device tokens to send the message.

In the tenth step of the second embodiment or at step 70, as illustrated by an arrow 80, the notification service provider 16 looks up its database for each device token to see if that device trusts that website to send a push notification (there should be a mapping record in the database mapping the device token to the website based on step 6). If the website is trusted, the notification service can make use of a device platform specific platform push provider such as APNS or GCM to send the push message.

Figure 5:
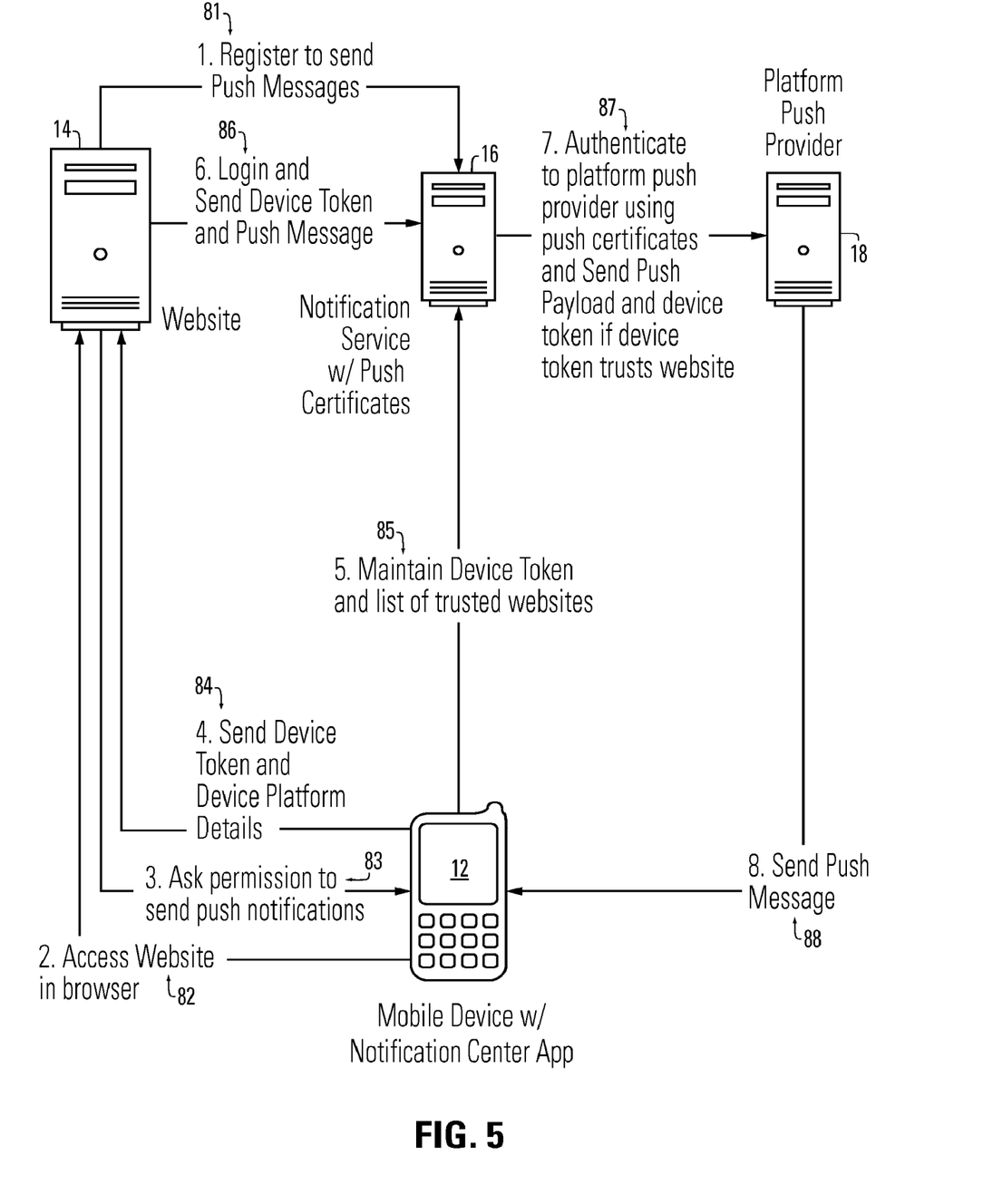
FIG. 5 is a block diagram illustrating the second embodiment of the push notification system in accordance with various embodiments of the present invention

FIG. 5 is a system diagram illustrating the first embodiment of the push notification system as described with respect to FIG. 4. The system diagram shows the mobile device 12, the web application server (or "website") 14, the notification servicer provider 18, and the platform push provider 18. The operational process of the system diagram in FIG. 5 is similar to the description provided in the sequence diagram of FIG. 4.

Figure 6:
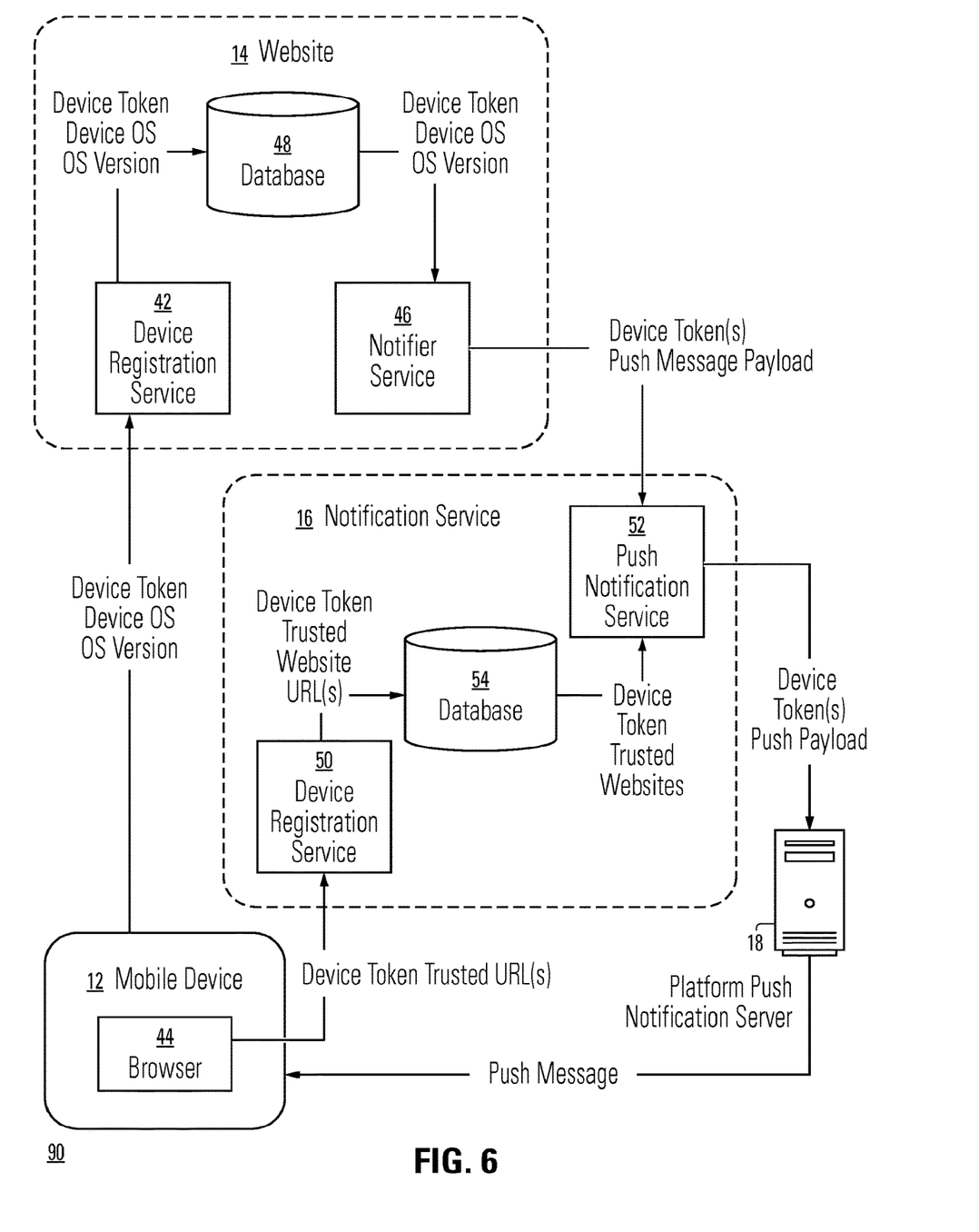
FIG. 6 is a block diagram elaborating elements of the push notification system in the second embodiment in accordance with various embodiments of the present invention.

FIG. 6 is a block diagram elaborating elements of the push notification system 60 in the second embodiment. In terms of website, the device registration service 42 is a rest service that can receive a JSON based payload posted over http/https(s) and is used to store the device token, device operating system and device OS version sent by the web page loaded on the device browser when user chooses to allow notifications from the website. The JSON message can be in the following format:
{
  deviceToken: <the unique device token corresponding to the application on a particular device>,
  deviceOS: <the device operating system>, deviceOSVersion: <the version of the device operating system>}

When the website needs to send a push notification, the notifier service 46 reads the device token information from the database and formats the push payload based on the device operating system requirements and logs onto the notification service and sends the push payload and the device tokens to which the push message needs to be sent.

In terms of notification service 16, the device registration service 50 is a rest service that can receive a JSON based payload posted over http/https(s) and is used to store the device token and the trusted URL of a website sent by the notification center app when user chooses to allow notifications from the website. The Json message can be in the following format:
{
  deviceToken: <the unique device token corresponding to the application on a particular device>,
  trustedHost: <the host URL of the website that is trusted by the device user>}

The rest service can offer create and delete actions whereby this mapping can be added or removed based on the user choice.

When the website sends a push notification to this rest service, the push notification service 52 reads the device token information from the database 54 and checks if a mapping exists between the device Token and the website host. If so, this service connects to the platform push provider (such as Apple's APNS or Google's GCM) and sends the push payload and the device tokens to which the push message needs to be sent.

In terms of the mobile device 12, the browser app 44 can be any browser installed on the mobile device. This is not limited to the browser that comes out of the box with the operating system.

The following is an example flow in an enterprise leave request scenario. First, the server having the leave request application is registered with the notification service using a service user. Second, a manager goes to the leave request website to view and approve leave requests. Third, the web page requests the device token for the browser that prompts the manager for permission to send push notifications. Fourth, the manager chooses allow causing the browser to provide the device token to the page. Fifth, the browser registers the leave request website as a trusted website with the notification service. The page connects to the leave request website's device registration service (https://www.xyz.com/registerdevice) and posts its device token and device OS and version details. Sixth, an end user applies for leave. This causes the web application server's business logic to identify the user ID of the end user's manager and the manager's device token and send the device token and the push message containing the leave request information. Seventh, the notification service checks that the device token is mapped to the leave request website and if so, sends the push message to the platform push provider. Eighth, the push message reaches the device and the manager sees an alert message that "John Doe has applied for 2 days Paid Leave" and when the manager touches the notification, it launches the browser that reads the push message for the URL parameter which can look like the below example: https://xyz.com/leaverequest?id=6535653 where the id can be a leave request ID. Ninth, the browser goes to this URL and the leave request application understands that the user is trying to view a particular leave request and goes straight to that entry allowing the manager to approve quickly.

The following is an example flow in a global scenario (news web site). First, the news website is registered with the notification service and receives login credentials. Second, a user goes to the new site. Third, the web page requests the device token for the browser that prompts the manager for permission to send push notifications. Fourth, the user chooses allow causing the browser to provide the device token to the page. Fifth, the browser registers the leave request website as a trusted website with the notification service. The page connects to the leave request website's device registration service (https://www.xyz.com/registerdevice) and posts its device token and device OS and version details. Sixth, some breaking news happens. This causes the web application server's business logic to read the list of device tokens and send the device token and the push message containing the breaking news information. Seventh, the notification service checks that the device token is mapped to the news website and if so, sends the push message to the platform push provider. Eighth, the push message reaches the device and the user sees an alert message that "Arctic freeze grounds planes" and when the user touches the notification, it launches the browser that reads the push message for the URL parameter which can look like the below example: https://xyz.com/newsarticles?id=6535653 where the id can be a new article ID. Ninth, the browser goes to this URL and the news website understands that the user is trying to view a particular story and goes straight to that page.

Some portions of the above description describe the embodiments in terms of algorithmic descriptions and processes, e.g., as with the description within FIGS. 1-6. These operations (e.g., the processes described above), while described functionally, computationally, or logically, are understood to be implemented by computer programs or equivalent electrical circuits, microcode, or the like. The computer programs are typically embedded as instructions that can be stored on a tangible computer readable storage medium (e.g., flash drive disk, or memory) and are executable by a processor, for example, as described in FIGS. 1-7. Furthermore, it has also proven convenient at times, to refer to these arrangements of operations as modules, without loss of generality. The described operations and their associated modules may be embodied in software, firmware, hardware, or any combinations thereof.

Figure 7:
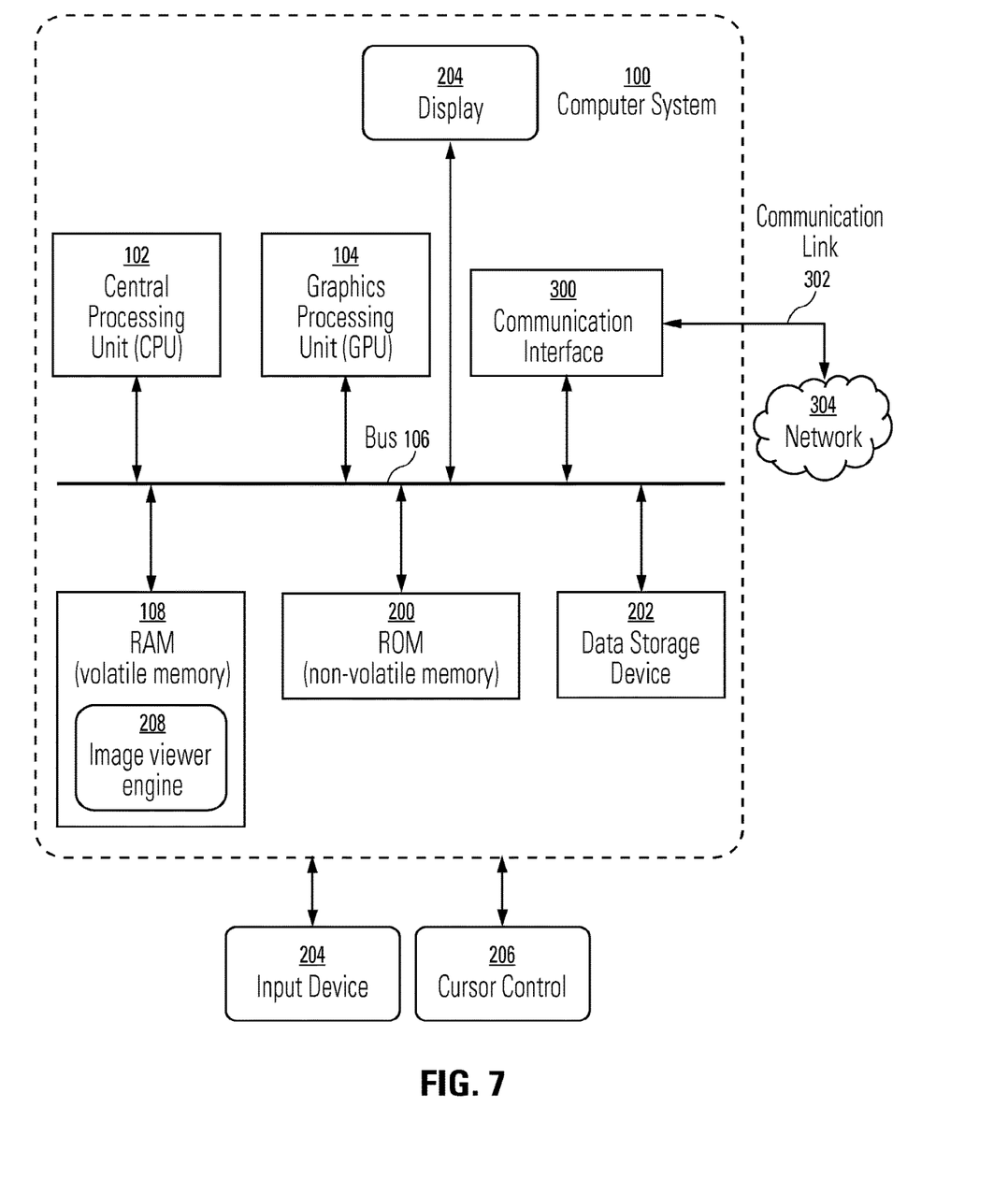
FIG. 7 is a block diagram illustrating an exemplary computer system for processing the push notifications upon which a computing embodiment of the invention may be implemented in accordance with various embodiments of the present invention.

FIG. 7 is a block diagram illustrating an exemplary computer system for processing the push notifications upon which a computing embodiment of the invention may be implemented in accordance with various embodiments of the present invention. The computer system refers to but not limited to a computer on a mobile device 12, a computer on the web application server 14, a computer on the notification service provider, and a computer on a platform push provider 16, as well as other client-server computing environment or a cloud computing environment. A computer system 100 includes a central processing unit (CPU) 102 and a graphics processing unit (GPU) for processing information. The CPU 102 and the GPU 104, collectively processors, are coupled to a bus 106 or other communication medium for sending and receiving information. The processors 102, 104 may be an example for implementing a computer in the mobile device 12, the web application server 14, the notification service provider 16, and a platform push provider 18, or other equivalent processors that are used to perform various functions described herein. In some cases, the computer system 100 may be used to implement the CPU 102 and the GPU 104 as a system-on-a-chip integrated circuit. The computer system 100 also includes a main memory 108, such as a random access memory (RAM) or other dynamic storage device, coupled to the bus 106 for storing information and instructions to be executed by the CPU 102 and the GPU 104. The main memory 108 also may be used for storing temporary variables or other intermediate information during execution of instructions by the CPU 102 and the GPU 104. The computer system 100 further includes a read only memory (ROM) 120 or other static storage device coupled to the bus 106 for storing static information and instructions for the CPU 102 and the GPU 104. A data storage device 122, such as a magnetic disk (e.g., a hard disk drive), an optical disk, or a flash memory, is provided and coupled to the bus 106 for storing information and instructions. The computer system 100 (e.g., desktops, laptops, tablets) may operate on any operating system platform using Windows® by Microsoft Corporation, MacOS or iOS by Apple, Inc., Linux, UNIX, and/or Android by Google Inc.

The computer system 100 may be coupled via the bus 106 to a display 124, such as a flat panel for displaying information to a user. An input device 126, including alphanumeric, pen or finger touchscreen input, other keys, or voice activated software application (also referred to as intelligent personal assistant or a software application that uses a natural language user interface) is coupled to the bus 16 for communicating information and command selections to the processor 102. Another type of user input device is cursor control 128, such as a mouse (either wired or wireless), a trackball, a laser remote mouse control, or cursor direction keys for communicating direction information and command selections to the CPU 12 and the GPU 14 and for controlling cursor movement on the display 124. This input device typically has two degrees of freedom in two axes, a first axis (e.g., x) and a second axis (e.g., y), that allows the device to specify positions in a plane.

The computer system 100 may be used for performing various functions (e.g., calculation) in accordance with the embodiments described herein. According to one embodiment, such use is provided by the computer system 100 in response to the CPU 102 and the GPU 104 executing one or more sequences of one or more instructions contained in the main memory 108. Such instructions may be read into the main memory 106 from another computer-readable medium, such as storage device 122. Execution of the sequences of instructions contained in the main memory 108 causes the CPU 102 and the GPU 104 to perform the processing steps described herein. One or more processors in a multi-processing arrangement may also be employed to execute the sequences of instructions contained in the main memory 108. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the CPU 102 and the GPU 104 for execution. Common forms of computer-readable media include, but are not limited to, non-volatile media, volatile media, transmission media, a floppy disk, a flexible disk, a hard disk, magnetic tape, any other magnetic medium, a CD-ROM, a DVD, a Blu-ray Disc, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read. Non-volatile media includes, for example, optical or magnetic disks, such as the storage device 122. Volatile media includes dynamic memory, such as the main memory 108. Transmission media includes coaxial cables, copper wire, and fiber optics. Transmission media can also take the form of acoustic or light waves, such as those generated during radio wave and infrared data communications.

Various forms of computer-readable media may be involved in carrying one or more sequences of one or more instructions to the CPU 102 and the GPU 104 for execution. For example, the instructions may initially be carried on a magnetic disk of a remote computer. The remote computer can load the instructions into its dynamic memory and send the instructions over a communication link 130. The computer system 100 includes a communication interface 130 for receiving the data on the communication link 132. The bus 106 carries the data to the main memory 118, from which the CPU 102 and the GPU 104 retrieve and execute the instructions. The instructions received by the main memory 108 may optionally be stored on the storage device 122 either before or after execution by the CPU 102 and the GPU 104.

In one embodiment, the RAM volatile memory 108 is configured to store and run an image viewer engine 128 (also referred to as image viewer software engine). The image viewer can be stored and executed from a variety of sources, including the ROM non-volatile memory 120, the data storage device 122, as well as execution by the CPU 102 or the GPU 114.

The communication interface 130, which is coupled to the bus 116, provides a two-way data communication coupling to the network link 132 that is connected to a communication network 134. For example, the communication interface 130 may be implemented in a variety of ways, such as an integrated services digital network (ISDN), a local area network (LAN) card to provide a data communication connection to a compatible LAN, a Wireless Local Area Network (WLAN) and Wide Area Network (WAN), Bluetooth, and a cellular data network (e.g. 3G, 4G). In wireless links, the communication interface 30 sends and receives electrical, electromagnetic or optical signals that carry data streams representing various types of information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

The invention can be implemented in numerous ways, including as a process, an apparatus, and a system. In this specification, these implementations, or any other form that the invention may take, may be referred to as techniques. In general, the order of the connections of disclosed apparatus may be altered within the scope of the invention.

The present invention has been described in particular detail with respect to some possible embodiments. Those skilled in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. An ordinary artisan should require no additional explanation in developing the methods and systems described herein but may nevertheless find some possibly helpful guidance in the preparation of these methods and systems by examining standard reference works in the relevant art.

These and other changes can be made to the invention in light of the above detailed description. In general, in the following claims, the terms used should not be construed to limit the invention to the specific embodiments disclosed in the specification and the claims, but should be construed to include all methods and systems that operate under the claims set forth herein below. Accordingly, the invention is not limited by the invention, but instead its scope is to be determined entirely by the following claims.

What we claim is:

1. A method comprising:
   in response to receiving an identification of a website, generating, by a mobile application executing on an electronic device, a token for the website, the token corresponding the electronic device and the identification of the website;
   transmitting, by the mobile application, a first data object message to a notification server to register a custom push notification protocol for the website, the first data object message comprising the token, the electronic device's platform information, and the identification of the website, and causing the notification server to store the token, the electronic device's platform information, and the identification of the website as part of a list of trusted websites associated with the token in a database;
   transmitting, by the mobile application to a webserver of the website, a second data object message permitting the website to send push notifications to the electronic device via the mobile application, the second data object message comprising the token and causing the webserver to transmit, responsive to a notification event a payload comprising the token and the identification of the website to the notification server; and
   in response to the notification server mapping the token received via the payload to the token stored in the database and in response to the identification of the website received via the payload matching the identification of the website stored by the notification server as part of the list of trusted websites associated with the electronic device corresponding to the token in the database, outputting, by the mobile application, a customized push notification in accordance with the custom push notification protocol.

2. The method of claim 1, wherein the website is accessed by a mobile browser application executing on the electronic device.

3. The method of claim 1, wherein the mobile application is launched by a mobile browser application executing on the electronic device.

4. The method of claim 1, further comprising prompting, by the mobile application, a user operating the electronic device that the website is requesting permission to send push notifications.

5. The method of claim 1, further comprising launching, by the mobile application, a URL of the website in response to a user operating the electronic device interacting with the customized push notification.

6. The method of claim 1, further comprising playing, by the mobile application, different sounds based on the identification of the website.

7. The method of claim 1, further comprising displaying, by the notification server, different icons based on the identification of the website.

8. The computer system comprising:
   an electronic device having an operating system and configured to execute a mobile application;
   a notification server in communication with the mobile application, the notification server configured to register a custom push notification protocol for different websites;

the mobile application in communication with the notification server and executing on the electronic device, the mobile application configured to:
  in response to receiving an identification of a website, generate a token for the website, the token corresponding to the electronic device and the identification of the website;
  transmit a first data object message to the notification server to register the custom push notification protocol for the website, the first data object message comprising the token, the electronic device's platform information, and the identification of the website, and causing the notification server to store the token, the electronic device's platform information, and the identification of the website as part of a list of trusted websites associated with the token in a database;
  transmit to a webserver of the website, a second data object message permitting the website to send push notifications to the electronic device via the mobile application, the second data object message comprising the token and causing the webserver to transmit, responsive to a notification event, a payload comprising the token and the identification of the website to the notification server; and
  in response to the notification server mapping the token received via the payload to the token stored in the database and in response to the identification of the website received via the payload matching the identification of the website stored by the notification server as part of the list of trusted websites associated with the electronic device corresponding to the token in the database, output a customized push notification in accordance with the custom push notification protocol.

9. The computer system of claim 8, wherein the website is accessed by a mobile browser application executing on the electronic device.

10. The computer system of claim 8, wherein the mobile application is launched by a mobile browser application executing on the electronic device.

11. The computer system of claim 8, wherein the mobile application is further configured to prompt a user operating the electronic device that the website is requesting permission to send push notifications.

12. The computer system of claim 8, wherein the mobile application is further configured to launch a URL of the website in response to a user operating the electronic device interacting with the customized push notification.

13. The computer system of claim 8, wherein the mobile application is further configured to play different sounds based on the identification of the website.

14. An electronic device in communication with a notification server, comprising:
  one or more processors configured to execute a mobile application to output customized notifications, the mobile application configured to:
  in response to receiving an identification of a website, generate a token for the website, the token corresponding to the electronic device and the identification of the website;
  transmit a first data object message to the notification server to register a custom push notification protocol for the website, the first data object message comprising the token, the electronic device's platform information, and the identification of the website, and causing the notification server to store the token, the electronic device's platform information, and the identification of the website as part of a list of trusted websites associated with the electronic device corresponding to the token in a database;
  transmit to a webserver of the website, a second data object message permitting the website to send push notifications to the electronic device via the mobile application, the second data object message comprising the token and causing the webserver to transmit, responsive to a notification event, a payload comprising the token and the identification of the website to the notification server; and
  in response to the notification server mapping the token received via the payload to the token stored in the database and in response to the identification of the website received via the payload matching the identification of the website stored by the notification server as part of the list of trusted websites associated with the electronic device corresponding to the token in the database, output a customized push notification in accordance with the custom push notification protocol.

15. The electronic device of claim 14, wherein the mobile application is a mobile browser application, and wherein website is accessed by the mobile browser application executing on the electronic device.

16. The electronic device of claim 14, wherein the mobile application is launched by a mobile browser application executing on the electronic device.

17. The electronic device of claim 14, wherein the mobile application is further configured to prompt a user operating the electronic device that the website is requesting permission to send push notifications.

18. The electronic device of claim 14, wherein the mobile application is further configured to launch a URL of the website in response to a user operating the electronic device interacting with the customized push notification.

19. The electronic device of claim 14, wherein the mobile application is further configured to play different sounds based on the identification of the website.

20. The electronic device of claim 14, wherein the mobile application is further configured to display different icons based on the identification of the website.

* * * * *